United States Patent [19]

Garrett et al.

[11] 4,122,045
[45] Oct. 24, 1978

[54] NON-PUNKING NON-CORROSIVE PHENOLIC FOAM CONTAINING SODIUM TETRABORATE

[75] Inventors: William L. Garrett, Lancaster; Roy G. Grube, Millersville; Wayne C. Kennedy, Lititz, all of Pa.

[73] Assignee: Armstrong Cork Company, Lancaster, Pa.

[21] Appl. No.: 689,686

[22] Filed: May 24, 1976

[51] Int. Cl.$^2$ ............................................... C08J 9/00
[52] U.S. Cl. .................................... 521/103; 521/181
[58] Field of Search ....................................... 260/2.5 F

[56] References Cited

U.S. PATENT DOCUMENTS

| 3,298,973 | 1/1967 | Quarles et al. | 260/2.5 F |
| 3,484,391 | 4/1966 | Wheatley et al. | 260/2.5 F |
| 3,663,489 | 5/1972 | Byerley et al. | 260/2.5 F |
| 3,673,130 | 6/1972 | Papa et al. | 260/2.5 F |
| 3,694,387 | 9/1972 | Junger et al. | 260/2.5 F |
| 3,740,358 | 6/1973 | Christie et al. | 260/2.5 F |

FOREIGN PATENT DOCUMENTS 824,251  11/1959  United Kingdom ............... 260/2.5 F

OTHER PUBLICATIONS

Chem. Abstracts, vol. 75, 153122q, 1971.
Chem. Abstracts, vol. 66, 21852g, 1967.

Primary Examiner—M. J. Welsh

[57] ABSTRACT

A phenolic foam that is non-corrosive to metallic substrates over which it is applied is disclosed herein. The foam is prepared by hardening an intimate mixture of a conventional foamable phenolic resole resin containing a blowing agent, a hardener and a surface active agent, and sodium tetraborate.

9 Claims, No Drawings

NON-PUNKING NON-CORROSIVE PHENOLIC FOAM CONTAINING SODIUM TETRABORATE

BACKGROUND OF THE INVENTION

1. Field of the Invention

The present invention relates to the production of an improved foam of a thermosettable phenol-formaldehyde condensate. More particularly, it relates to an improved phenolic foam useful for insulating metallic conduits and other substrates which has a high resistance to combustion, is anti-punking, and is of low corrosion to the metallic substrate.

2. Description of the Prior Art

With the advent of reinforced plastic casting, laminating and molding technology, the use of plastic materials has grown to include structural and decorative applications in buildings, aircraft, vehicles and other structures. The majority of the economically useful plastics are, however, combustible and the flammability of such materials is a prime consideration in determining their degree of usefulness in a given application.

Phenolic resin foams are noted for their low flammability and their ability to resist a direct application of flame. These materials do not melt or soften unless such flame is accompanied by copious amounts of air or oxygen. It has been known to prepare such foams from aqueous phenol-formaldehyde resins using an acid catalyst. The reaction is exothermic, which converts the water present to steam. The liquid resin is gradually converted into an infusible solid, entrapping such steam which, in turn, gives the cellular structure of the foam. In place of, or in conjunction with water, other volatiles may also be used to aid in foam formation. However, it is a well-recognized problem that the phenolic foams produced in this manner experience severe punking after being exposed to flame. Punking, as is well known, is the phenomenon of continuing to glow and combust without a visible flame even after the combustion source has been removed. Such punking is a serious limitation in the use of these materials as thermal insulation, especially in inhabited structures.

The production of non-punking foams has generally been disclosed in U.S. Pat. No. 3,298,973. In that patent, phenol-aldehyde resole resins having a viscosity of from about 200 to about 300,000 centipoises at 25° C. are reacted with a catalyst that is a mixture of at least two acidic reagents. The catalyst is a solid mixture of boric acid or its anhydride and an organic hydroxy acid in which the hydroxy group is on a carbon atom not more than one carbon atom removed from a carboxy group. Because of the viscosity of the resole resin, this process is disadvantageously carried out by a slow and tedious batch procedure. Further, even when using large amounts of boron oxides in these foams, punking is not completely controlled.

Other boron-containing, non-punking phenol-formaldehyde foams are described in U.S. Pat. No. 3,663,489 disclosing boron-containing compounds formed by reacting boric acid or boric oxide with glyoxal and its derivatives, and U.S. Pat. No. 3,740,358 disclosing boron-containing compositions utilizing boric acid or boric oxide in conjunction with hydrochloric acid. British Pat. No. 824,251 sets forth a method for the production of phenol-aldehyde castings free from voids by using as catalysts boric acid or boric oxide with hydroxy organic compounds. The catalysts described in this latter patent are not capable of producing foams, and there is no indication that the materials produced have any improved fire-retardant or heat-resistant properties. The latter two United States patents, while producing non-punking foams, result in foamed materials that are extremely high in acidity and, when in contact with metallic substrates such as metallic pipes, girders, panels, tubes, and the like, cause severe corrosion.

It is apparent, therefore, that there is a need in industry to provide heat-resistant phenolic foams which have a high degree of anti-punking character and which are also non-corrosive to metallic substrates over or on which such may be applied.

SUMMARY OF THE INVENTION

It is accordingly one object of the present invention to provide a new heat-resistant phenolic foam which will not burn or punk when exposed to direct flame.

Another object of the present invention is to provide a novel phenolic foam containing compounds of boron which give a foam of superior resistance to combustion and punking when exposed to flame.

Yet another object in accordance with the present invention is to provide a novel heat-resistant phenolic foam composition containing sodium tetraborate which gives a foam of superior resistance to combustion and punking and additionally creates a foam that is non-corrosive when used on or over metallic substrates.

These and other advantages of the present invention will become apparent from the following detailed description and examples.

DESCRIPTION OF THE PREFERRED EMBODIMENTS

In accordance with the objects, it has been discovered that phenolic foams with high flame and heat resistance and low corrosivity can be made by adding to a phenolic resole resin a boron-containing compound.

The boron-containing compound is a sodium oxide/boron oxide composition commonly termed anhydrous borax, which is the product resulting from the substantially complete dehydration of normal borax. It is chemically equivalent to sodium tetraborate of the formula $Na_2B_4O_7$. It has been found useful to employ sodium tetraborate in its completely anhydrous condition although the completely hydrated, more common form $Na_2B_4O_7.10H_2O$ will also provide anti-punking foams of low corrosivity. Preferably, sodium tetraborate containing 0.3% water (on analysis) is used in accordance with the present invention, e.g. equivalent to a completely anhydrous sodium tetraborate of 99.7%. Various organic and/or inorganic impurities other than water may also be present in anhydrous sodium tetraborate, but such should not cause an undue influence on the catalysis of the thermosetting phenol-formaldehyde resole resin, e.g. act as a negative catalyst.

Particle size of the anhydrous sodium tetraborate is also an important factor in the formation of an acceptable foam in accordance with the present invention. If the anhydrous sodium tetraborate is too small in particle size, such will inhibit the acid catalyst, causing slow or no foaming. Too large a particle size of the tetraborate causes ruptures in the blown foam cell walls and rough textures on the resulting foam. An anhydrous sodium borate particle size of 12-200 mesh (U.S. standard sieve number) is acceptable herein. A mesh size of 12-60 mesh is preferred.

The phenol-aldehyde condensation products employed in this invention are not narrowly critical and are well known in the art of phenol foams. They are commonly called one-step resins or "resole resins", being the condensation product of a monohydric phenol with an aldehyde. They are generally produced, for instance, by condensing one mole of a phenol with about one to three moles of an aldehyde in an alkaline medium and subsequently distilling the water present in vacuum so as to obtain a liquid having a solids content of 60% to 99%, preferably 70% to 97% by weight. Any of the well-known conventional alkaline catalysts suitable for promoting the reaction of phenols and aldehydes to give resoles may be used. Examples of such catalysts are sodium hydroxide, potassium hydroxide, barium hydroxide, calcium hydroxide, calcium oxide, sodium carbonate, and sodium bicarbonate. It will be appreciated that any of the alkali or alkaline earth metal oxides, hydroxides, carbonates and bicarbonates other than those mentioned above may also be employed. Preferred are the resins of phenol per se and formaldehyde, although other phenols such as metacresol, metaxylenol and the like can also be employed, as can mixtures of phenol and the cresols. Similarly, formaldehyde can be replaced by other aldehydes or compounds that liberate aldehydes such as paraformaldehyde, formalin and the like.

As disclosed above, the liquid resole resins are alkaline catalyzed condensates which are carried to only a mild state of resinification so that they are normally liquid and generally water soluble. These are more often referred to in the art as "A" stage resins, the "C" stage resins being typical of the fully cured thermoset materials.

The foamable resole resin of the present invention incorporates a surfactant to reduce the surface tension of the resin during foaming, thereby aiding in the stabilization of the growing cells. The amount of surfactant normally employed ranges from about 0.5% to about 10% by weight of the resole resin, preferably 3% to 5% is used. Typical of surface active agents that can be employed in the practice of the present invention include any of the non-ionic types such as the polyethers and the polyalcohols, including the condensation products of alkaline oxides such as ethylene oxides and propylene oxides with alkyl phenols, fatty acids, alkyl silanes and silicones and like materials. These are exemplified by such products as octadecyl phenol-ethylene oxide, polyoxyethylene dodecyl phenol, polyoxyethylene glycolates and similar polyoxyethylated fatty acids and vegetable oils. Preferred are the polyoxyethylated fatty acid esters of polyoxyethylene sorbitan such as polyoxyethylene sorbitan monolaurate, polyoxyethylene sorbitan tristearate, polyoxypropylene sorbitan monolaurate, and polyoxyethylene sorbitan monopalmitate. Similarly useful are the siloxane-oxyalkylene block copolymers such as those containing a Si—C linkage between the siloxane and the oxyalkylene moieties. Quaternary ammonium compounds are also useful in the present invention such as dimethylbenzyl ammonium chloride and diisobutylphenoxyethoxyethyl dimethylbenzyl ammonium chloride.

With regard to the blowing agents that may be used, any of the halogenated alkanes, or any inert volatile agent which will be volatile from about 70° F. to 220° F. at atmospheric pressure, are useful herein. As typical examples of such, hydrocarbons, oxyhydrocarbons, or halohydrocarbons such as alkyl ethers, ketones, lower alkanes and halogenated alkanes, as for example, pentane, hexane, diethylether, diisopropyl ether, acetone, dichloromethane, dichloroethane, and the like, are useful. Most of these agents provide open cell foams. Closed cell foams can be provided with the halogenated alkanes, such as trichlorofluoromethane, 1,1,2-trichloro-1,2,2-trifluoroethane, 1,1,2,2-tetrachloro-2,2,-difluoroethane, 1,1,1,2-tetrachloro-2,2-difluoroethane and the like. Other blowing agents with the 70°–220° F. boiling point can be used alone or in combination. A mixture of any such blowing agents can be employed in which each is designed to volatilize at different temperatures so as to give a volatilization throughout the entire exothermic curing reaction.

The amount of foaming agent is not narrowly critical. Amounts of from 1 to 20 parts per 100 parts by weight of resole are most desirable, provided that the foamable composition is of viscosity above about 200 centipoises. Some of these foaming agents dilute the resole resin so as to depress the viscosity significantly and cannot be used in large amounts. However, and because of the unusual solubility phenomenon of the fluorocarbons, these can be employed in much greater amounts. These blowing agents are preferred and such are preferably employed in about 5 to 12 parts per 100 parts resin.

Acidic curing agents are useful in accordance with the present invention in forming the foamable resole resin compositions. The acidic curing agent typically used in this process may be any strong acid compound which is conventionally used in curing phenolic foams. These are Lewis acids, hydrochloric acids, sulfuric acids, nitric acids, phosphoric acids, including pyrophosphoric acids, and polyphosphonic and, hydrobromic acids, hydroiodic acids, trichloroacetic acids, and sulfonic acids. The latter term is intended to include organic sulfonic acids such as phenol sulfonic acid, chlorosulfonic acid, mixed alkane sulfonic acid, 1-naphthol-8-sulfonic acid, resorcinol sulfonic acid, and the like. All such acids are used in aqueous solution. Especially preferred is a mixture of 60 parts of toluene sulfonic acid admixed with 20 parts solution of sulfuric acid, the balance (20 parts) being water. The acid catalyst is used in an amount ranging from 2% to about 20% by weight and preferably about 8% to 12% by weight of resin.

It is to be understood that in the foamed resins of this invention, there may be present other ingredients so as to impart other desirable properties. These ingredients include plasticizers, metal salts, pigments, dyes, fillers, stabilizers, neutralizers, flame proofers, fiberglass, asbestos, silica, solid nucleating agents, and like additives without departing from this invention. In fact, certain beneficial properties result from many of such additives. For example, when using mineral oil as a plasticizer, it is advantageous to blend the anhydrous sodium tetraborate with this plasticizer and then to mix the resulting slurry with the resole and the acid catalyst, thus preventing atmospheric moisture from diminishing the ability of the anhydrous sodium tetraborate to absorb water from the resole reaction mixture. Mineral oil or other related plasticizers are effective in this composition from 0 to 50 parts per 100 parts resin, 4 through 8 are preferable.

Metal salts are also useful ingredients in the foamed formulations, the most preferable one being anhydrous boric acid which can combine with water in the reacting mass and enhance the properties of the final foam.

These are used in 1-15 parts per hundred parts of resole resin.

In order to prepare the foamed phenol-formaldehyde composition having the desired properties of fire retardancy, anti-punking and low metallic corrosivity, the starting "A" stage resole resin should have a water content not greater than 25%. Although higher percentages of water can be present in the reacting mass, such higher percentages require additional anhydrous sodium tetraborate to be effective in giving the final product a low water content. An anhydrous sodium tetraborate content of greater than 25 parts per hundred parts of resole, for example, necessitates greater amounts of catalyst so as to complete the foaming reaction. It also causes the density and the strength of the final foam to be diminished. Concentrations of less than 1 part per hundred parts resole do not give any significant effect in anti-punking ability.

In addition to controlling the amount of residual water in the final foam, the anhydrous sodium tetraborate serves to act as a catalyst in the foaming and curing of the phenol-aldehyde resole as a result of the heat generated from forming the decahydrate water reaction product. Further, both the hydrated reaction product and any unhydrated or partially hydrated sodium tetraborate provide sufficient alkalinity in the final foam so as to effectively neutralize any of the above-disclosed curing catalysts. It should be appreciated that the anhydrous sodium tetraborate particle size is particularly responsible for the slow rate of neutralization of the catalyst, such neutralization occurring effectively after the foam has been expanded and cured. Additionally, the boric acid formed from such neutralization serves to enhance the fire retardant properties of the foam.

The process of the present invention is carried out by blending the components in a high intensity mixer. The individual components of the foamable resole resin mentioned above are delivered to the mixer by metering lines and mixed therein with sodium tetraborate anhydrate. To reduce the number of metering lines, some of the components can be premixed as earlier mentioned. After mixing the liquid phenol-formaldehyde resole, acid catalyst, and blowing agents, the anhydrous sodium tetraborate and optionally, plasticizer and anhydrous boric acid are added. The mixture may be deposited, for example, on a mandrel to be foamed and formed into a suitable pipe insulation. It may also be deposited onto a carrier sheet where, after foaming, a board-type or slab insulator is formed.

The following examples and tests are presented to illustrate the preferred embodiments of this invention, but it is to be understood that they do not represent any limitations thereto.

The phenol-aldehyde resole resin especially used in the following examples, hereafter disclosed in the examples and tables as "resole", was made by the following procedure.

EXAMPLE 1

280 parts by weight of phenol are condensed with 450 parts of a 30 percent aqueous formaldehyde solution with the addition of 1.430 parts of sodium hydroxide in aqueous solution at 100° C. for 70 minutes. The reaction mixture obtained is then vacuum distilled down to a soild resin content of 72 to 78 weight percent. The resin thus made has at 20° C. a viscosity of 4000 to 7000 centipoises (Brookfield).

The foam formulation made in accordance with the present invention and disclosed in the below table are formed from the above-disclosed resole resin and, additionally, from two commercially available resole resins.

| Ingredient | Examples 2-10 | | | | | | | | |
|---|---|---|---|---|---|---|---|---|---|
| | II | III | IV | V | VI | VII | VIII | IX | X |
| Resole[a] | 100[a] | 100[a] | 100[a] | 100[g] | 100[g] | 100[g] | 100[h] | 100[h] | 100[h] |
| Surfactant[b] | 2 | 2 | 2 | 5 | 5 | 5 | 2 | 2 | 2 |
| Fluorotrichloromethane | 15 | 15 | 15 | 10 | 10 | 10 | 15 | 15 | 15 |
| Catalyst mixture[c] | 15 | 15 | 15 | 10 | 10 | 10 | 10 | 10 | 10 |
| Boric acid anhydride | — | — | — | 6 | 6 | 6 | — | — | — |
| Anhydrous sodium tetraborate | — | 7.5 | 10 | — | 5 | 7.5 | — | 5 | 10 |
| Plasticizer[d] | — | — | — | 6 | 6 | 6 | — | — | — |
| Density, lbs./ft.$^3$ | 1.4 | 1.7 | 1.8 | 1.8 | 2.2 | 2.5 | 1.9 | 2.0 | 2.2 |
| Punk[e] | Yes | No | No | No | No | No | Yes | No | No |
| Foam Collapse | No | No | No | No | No | No | No | No | No |
| pH | 2 | 5 | 7 | 1.5 | 6.5 | 8.0 | 1-2 | 5.0 | 7.5 |
| Corrosion[f] | 5-6 | — | 2 | 5-6 | — | 2 | 5-6 | — | 2 |

[a]Reichold Chemical phenol-formaldehyde Plyophen DR-391; viscosity (25° C.) 3000–5000 cps; 78–82% solids; 1.23–1.25 specific gravity
[b]Tween 60 (the polyoxyalkylene derivative of sorbitan monostearate)
[c]60-20-20 toluene sulfonic acid-sulfuric acid-water
[d]Mineral oil
[e]As outlined in Quarles, U.S. 3,298,973, Column 2, lines 36–51, test time 1 minute minimum
[f]Estimated on a scale of 1 to 10 (1 no corrosion) when the foam was adhered to a substrate of galvanized steel, copper and soft iron and removed for examination of substrate after 2 weeks at 30° F. and 6 months at 180° F. (average value). Note: Fiberglass insulation (Industry Standard) gives a corrosion value of 1–1.5.
[g]From Example 1
[h]Union Carbide phenol-formaldehyde BRL-2760; viscosity (25° C.) 2350–3150 cps; 78–81% solids.

All foams prepared in examples II-X of the above table and containing sodium tetraborate demonstrated a flame spread of under 25, and a smoke density index of 50 or less in accord with ASTM E-84 Tunnel Test, as set forth in "Standard Method of Test for Surface Burning Characteristics of Building Materials," both as to equipment and test procedure. This test procedure is identical in all respects to UL-723, ANSI No. 2.5, NFPA No. 255 and UBC No. 42-1.

The test results covered two parameters: flame spread classification and smoke density during a 10-minute fire exposure period. Asbestos-cement board and red oak flooring are used as comparative standards and their responses are assigned arbitrary values of 0 and 100, respectively.

The performance of each material is evaluated in relation to the performance of asbestos-cement board and red oak flooring under similar fire exposure.

Various modifications and changes may be made herein without departing from the spirit and scope of the present invention.

What is claimed is:

1. In a process for the manufacture of phenolic resin foams wherein a mixture of a phenol-aldehyde resole resin, a blowing agent, an acid catalyst, and an effective amount of a surface active agent are caused to form a solid foam, the improvement resulting in a heat-resistant, non-corrosive foam comprising adding to said mixture, prior to foaming, anhydrous sodium tetraborate of 12-200 mesh.

2. The process of claim 1 wherein 1 to 25 parts of said anhydrous sodium tetraborate is added per hundred parts of said phenolaldehyde resole resin.

3. The process of claim 1 wherein boric acid is added in addition to said sodium tetraborate.

4. The process of claim 3 wherein said boric acid is anhydrous boric acid.

5. A phenolic foam having improved non-corrosive character prepared by foaming and hardening and intimate mixture comprising
   (a) a conventional foamable phenolic resole resin containing a blowing agent, an acid catalyst and an effective amount of a surface active agent and
   (b) from 1% to 25% based on the phenol resole resin content of said mixture of anhydrous sodium tetraborate of 12-200 mesh.

6. The phenolic foam of claim 5 wherein 1 to 25 parts of anhydrous sodium tetraborate is mixed into said phenol resole resin.

7. A foamable composition of matter comprising
   (a) a liquid phenol-aldehyde resole having a solids content of 70-97% by weight;
   (b) 1 to 25 parts of 12-200 mesh anhydrous sodium tetraborate per hundred parts of said resole;
   (c) 2-20 parts of an acid catalyst per hundred parts of said resole;
   (d) 3-5 parts of a surface active agent per hundred parts of said resole; and
   (e) an amount of organic liquid forming agent sufficient to foam said composition.

8. The composition of claim 7 comprising additionally 1-15 parts of boric acid per hundred parts of resole.

9. The non-punking, non-corrosive, foamed and cured composition of claim 8.

* * * * *